US011323263B2

(12) United States Patent
Gargaro et al.

(10) Patent No.: US 11,323,263 B2
(45) Date of Patent: May 3, 2022

(54) SHARING OF SECRET INFORMATION FOR ACCESSING A WIRELESS COMPUTING NETWORK

(71) Applicant: INTERNATIONAL BUSINESS MACHINES CORPORATION, Armonk, NY (US)

(72) Inventors: Gianluca Gargaro, Rome (IT); Matteo Rogante, Rome (IT); Paolo Ottaviano, Rome (IT); Roberto Ragusa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 16/868,660

(22) Filed: May 7, 2020

(65) Prior Publication Data

US 2021/0351930 A1 Nov. 11, 2021

(51) Int. Cl.
*H04L 9/32* (2006.01)
*H04L 9/30* (2006.01)
*H04L 9/08* (2006.01)

(52) U.S. Cl.
CPC ............ *H04L 9/3231* (2013.01); *H04L 9/085* (2013.01); *H04L 9/30* (2013.01); *H04L 9/3213* (2013.01)

(58) Field of Classification Search
CPC ......... H04L 9/3231; H04L 9/085; H04L 9/30; H04L 9/3213
See application file for complete search history.

(56) References Cited

U.S. PATENT DOCUMENTS 9,710,634 B2 * 7/2017 Fort .................... G06F 21/36
9,741,265 B2 * 8/2017 Bhatnagar ............. H04L 9/3228
(Continued)

FOREIGN PATENT DOCUMENTS

CA 2371329 C 12/2005
EP 2135400 B1 5/2017

OTHER PUBLICATIONS

Cisco, "MAC Authentication Bypass", cisco systems, 2007, pp. 1-30.
(Continued)

*Primary Examiner* — J. Brant Murphy
(74) *Attorney, Agent, or Firm* — Anthony Curro

(57) ABSTRACT

A solution is proposed for sharing secret information for accessing a wireless computing network. A corresponding method for distributing the secret information by a source (computing) device comprises receiving a public key of the a target (computing) device, transmitting a verification token to the target device, receiving an utterance of the verification token and transmitting the secret information encrypted with the public key in response to the utterance of the verification token. A corresponding method for obtaining the secret information by a target (computing) device comprises transmitting a public key of the target device, receiving a verification token, outputting the verification token and receiving the secret information encrypted with the public key in response to an utterance of the verification token. Corresponding computer programs and computer program products are also proposed. Moreover, a source computing device and a target computing device for implementing the methods are proposed.

20 Claims, 6 Drawing Sheets

(56) References Cited

U.S. PATENT DOCUMENTS

| | | | |
|---|---|---|---|
| 9,949,122 B2* | 4/2018 | Goldman | H04W 4/80 |
| 10,270,797 B1* | 4/2019 | Mincher | H04L 63/1433 |
| 10,779,162 B1* | 9/2020 | Wei | H04W 12/06 |
| 2014/0046664 A1* | 2/2014 | Sarkar | H04L 63/0861 |
| | | | 704/246 |
| 2019/0238534 A1* | 8/2019 | Murrells | H04W 12/50 |
| 2020/0382486 A1* | 12/2020 | Dunjic | H04L 63/18 |
| 2021/0328800 A1* | 10/2021 | Lee | H04L 63/10 |
| 2021/0368559 A1* | 11/2021 | Guo | H04W 12/06 |

OTHER PUBLICATIONS

Liu et al., "Tell the Device Password: Smart Device Wi-Fi Connection Based on Audio Waves", Sensors, www.mdpi.com/journal/sensors, Feb. 1, 2019, pp. 1-14.
Cisco, "Cisco Identity Services Engine with Identity Access Management and Single Sign-on Platforms," Cisco, 2015, 2 pgs.

* cited by examiner

SHARING OF SECRET INFORMATION FOR ACCESSING A WIRELESS COMPUTING NETWORK

BACKGROUND

The present disclosure relates to the information technology field. More specifically, this disclosure relates to the sharing of secret information.

The background of the present disclosure is hereinafter introduced with the discussion of techniques relating to its context. However, even when this discussion refers to documents, acts, properties and the like, it does not suggest or represent that the discussed techniques are part of the prior art or are common general knowledge in the field relevant to the present disclosure.

Secret information is commonly used to control (hardware and/or software) resources of computing systems when access to the resources is to be limited only to target subjects being authorized by source subjects. For this purpose, the secret information needs to be shared by the source subjects with the target subjects. However, the sharing of the secret information is challenging when no security context has been previously established between the source subjects and the target subjects (such as a prior knowledge, a common trust point, a secured communication channel and so on).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of requesting the utterance of a verification token for sharing the secret information.

Particularly, an embodiment provides a method for distributing secret information (for accessing a wireless computing network) by a source computing device; the method comprises receiving a public key of the a target computing device (requesting an access to the wireless computing network), transmitting a verification token to the target computing device, receiving an utterance of the verification token and transmitting the secret information encrypted with the public key in response to the utterance of the verification token.

A further aspect provides a computer program for implementing the method.

A further aspect provides a corresponding computer program product.

A further aspect provides a source computing device.

An embodiment provides a method for obtaining secret information (for accessing a wireless computing network) by a target computing device requesting an access to the wireless computing network; the method comprises transmitting a public key of the target computing device, receiving a verification token, outputting the verification token and receiving the secret information encrypted with the public key in response to an utterance of the verification token.

A further aspect provides a computer program for implementing the method.

A further aspect provides a corresponding computer program product.

A further aspect provides a target computing device.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

Figure 1A:
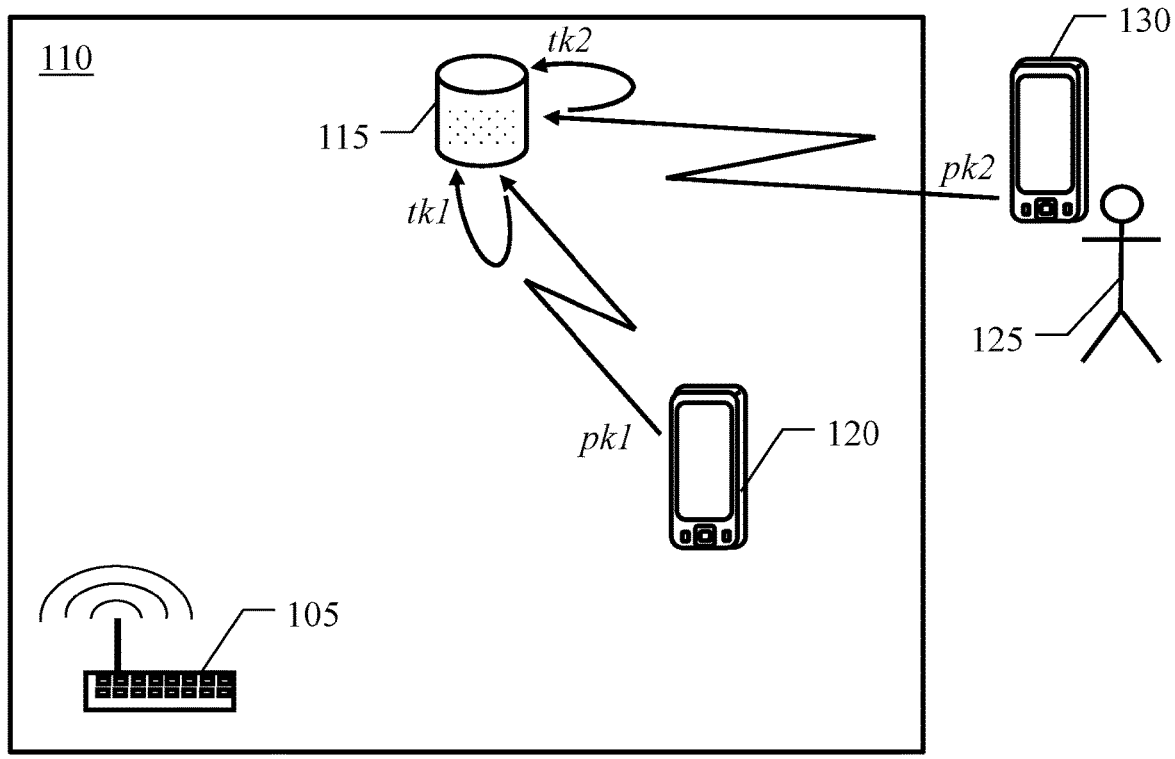
FIG. 1A-FIG. 1D show the general principles of the solution according to an embodiment of the present disclosure.

Secret information is commonly used to control (hardware and/or software) resources of computing systems when access to the resources is to be limited only to target subjects being authorized by source subjects. For this purpose, the secret information needs to be shared by the source subjects with the target subjects. However, the sharing of the secret information is challenging when no security context has been previously established between the source subjects and the target subjects (such as a prior knowledge, a common trust point, a secured communication channel and so on).

A typical scenario relates to wireless (computing) networks, such as of Wi-Fi type. Indeed, connection to a (wireless) Access Point (AP) providing access to a (protected) wireless network by client (computing) devices generally requires entering corresponding secret information. For security reasons, the secret information is generally a passphrase being very long and complex (such as comprising a combination of lowercase/uppercase letters, numbers and special symbols). Therefore, the passphrase is difficult to spell (for communicating it to users of the client devices) and to type (for storing it into the client devices). All of the above makes the operation of entering the passphrase time consuming and prone to errors.

This is especially evident when the access to the wireless network is to be granted to a (temporary) guest visiting a corresponding location for a short period (such as a dwelling or an office). Indeed, mobile (computing) devices, such as smartphones, are nowadays ubiquitous. Moreover, the increasing need of relying on remote services leveraging the Internet requires the capability for the mobile devices to access the Internet almost from everywhere while around. For this purpose, whenever possible, it is preferable to connect to access points (relaying information between the mobile devices connected thereto and the Internet, to which the access point is connected in a wired way). Indeed, the access to the Internet via the access points generally provides better performance than via a mobile telephone infrastructure. Particularly, this is generally experienced when the mobile telephone infrastructure is congested because too many mobile devices are connected thereto at the same time (such as in metropolitan areas). In any case, the access to the Internet via the mobile telephone infrastructure may be expensive (especially when travelling abroad).

Some simplified mechanisms are available to facilitate the connection to the access points, so as to obtain this result automatically or at least with reduced human intervention. For example, the Wireless Protected Setup (WPS) protocol allows connecting to an access point of Wi-Fi type without any need of entering its passphrase. In its most common implementation, the WPS protocol is based on a corresponding (push) button provided on the access point. Whenever the WPS button is pressed, any client device within a communication range of the access point automatically receives its passphrase (via a series of exchanged messages between them).

However, the WPS protocol is not selective, since the access point distributes the passphrase indiscriminately in response to the pressing of the WPS button. Therefore, the WPS protocol may be subject to attacks (of the man-in-the-middle type) from intruders attempting to access the wireless network illicitly. Particularly, an intruder may place an (unauthorized) client device within the transmission range of the access point (such as close to a window, especially when it is open); the client device of the intruder may eavesdrop the messages that are exchanged between the access point and an (authorized) client device (to which access to the wireless network has to be granted) so as to obtain the passphrase.

The intruder has now the possibility of using the passphrase to access the wireless network. This may allow the intruder to acquire valuable information that is transmitted over the wireless network in clear form. All of the above creates serious security exposures. For example, personal information transmitted over a wireless network in a dwelling by persons leaving there or confidential information transmitted over a wireless network in a company by employees working there may be grasped for malicious purposes.

With reference in particular to FIG. 1A-FIG. 1D, the general principles are shown of the solution according to an embodiment of the present disclosure.

Starting from FIG. 1A, a (wireless) access point 105 implements a wireless (computing) network among client (computing) devices connected thereto (generally also offering access to the Internet through it); the wireless network allows transferring information among the client devices belonging thereto without any physical connection (i.e., over the air). Typically, the wireless network is based on radio waves, for example, of Wi-Fi type conforming to the IEEE 802.11 standard. Particularly, the wireless network is a Wireless Local Area Network (WLAN), which interconnects the client devices in a location 110 extending over a limited area (such as a dwelling, an office and so on). For this purpose, the access point 105 has a transmission range that covers the whole location 110 (for example, of the order of some tens of meters across walls and up to the order of a few hundred meters in open air); however, in order to obtain this result, in practice the transmission range of the access point 105 also extends outside the location 110 (above, below and/or laterally). The access point 105 is protected, so as to limit access to the wireless network only to entitled subjects; for this purpose, the connection to the access point 105 is conditioned to the entering of secret information, such as a passphrase (i.e., a long sequence of lowercase/uppercase letters, numbers and special symbols, such as 30-50).

Particularly, the wireless network comprises a smart speaker 115 (or more). The smart speaker 115 is a client device capable of responding to vocal commands in human language, generally proceeded by a pre-defined (hot) word; the smart speaker 115 is mainly based on a hands-free user interface, so as to allow free interaction with it without the need of using hands. The smart speaker 115 offers a number of services, such as music playback, virtual assistant, home automation and so on.

A (new) client device 120 within the environment 110, for example, a smartphone, needs to access the wireless network (generally for connecting to the Internet through it). The client device 120 is authorized to do so, since its user is an entitled subject (such as a resident of the dwelling, an employee of the company, a temporary guest of the dwelling/company and so on). In order to avoid the (time consuming and prone to error) operation of entering the passphrase into the client device 120, a simplified mechanism is implemented to facilitate the connection to the access point 105.

In the solution according to an embodiment of the present disclosure, for this purpose the client device 120 transmits a presentation message, which comprises a public key of the client device 120 (pk1). The presentation message (for example, of sound type) has a transmission range allowing it to reach the smart speaker 115. In response thereto, the smart speaker 115 associates a verification token (tk1) with the client device 120; the verification token is relatively short and simple (for example, 4-6 numbers), and it is substantially unique for the client device 120 (for example, generated randomly). Moreover, an intruder 125 (i.e., any subject not entitled to access the wireless network) may attempt to access the wireless network illicitly with another client device 130 placed outside the environment 110 (but close enough to be within the transmission range of the access point 105 and to reach the smart speaker 115). For this purpose, the client device 130 as well transmits a presentation message, which comprises a public key of the client device 130 (pk2); as above, in response thereto the smart speaker 115 associates a corresponding verification token (tk2) with the client device 130.

Figure 1B:
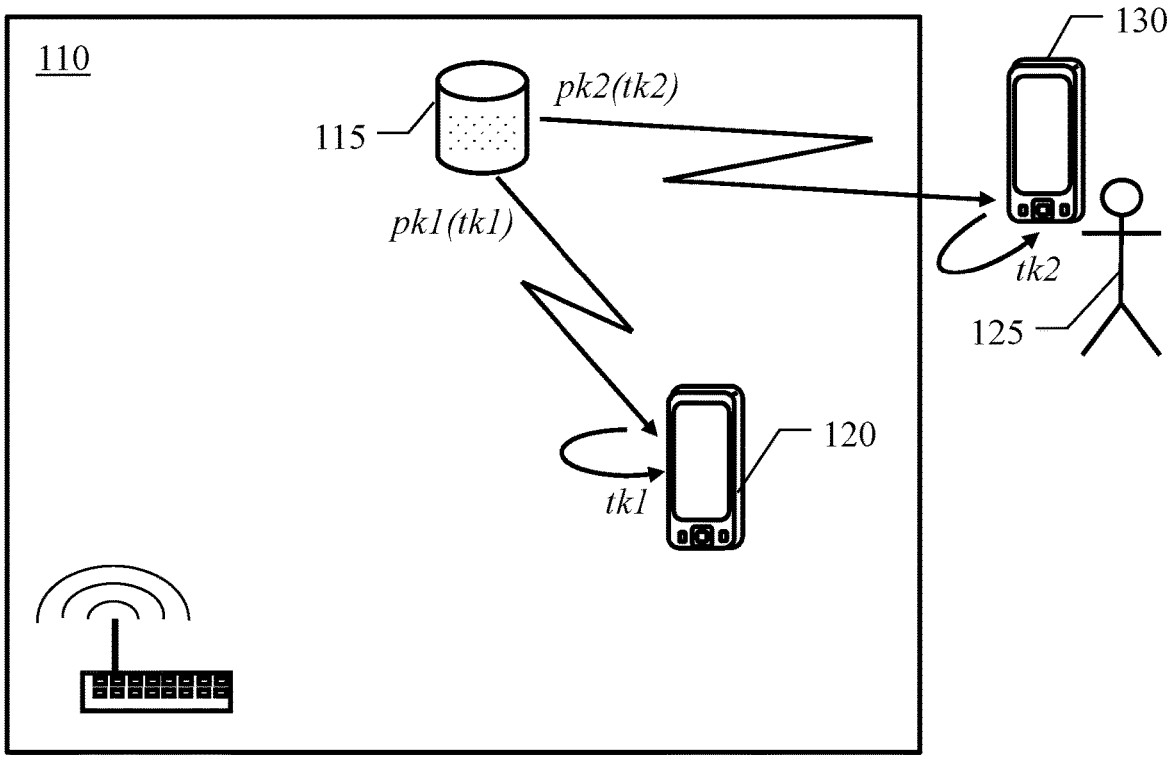

Moving to FIG. 1B, the smart speaker 115 transmits a verification message, which comprises the verification token of the client device 120, for example, encrypted with its public key (pk1 (tk1)). The verification message (for example, again of sound type) has a transmission range that covers the whole location 110, so as to allow it to reach the client device 120. In response thereto, the client device 120 extracts the encrypted verification token from the verification message, and decrypts it with a (secret) private key corresponding to its public key. Likewise, the smart speaker 115 transmits another verification message, which comprises the verification token of the client device 130 encrypted with its public key (pk2(tk2)). As above, in practice the transmission range of the verification message also extends outside the location 110, so that it reaches the client device 130. In response thereto, the client device 130 as well extracts the encrypted verification token from the verification message, and decrypts it with a (secret) private key corresponding to its public key.

Figure 1C:
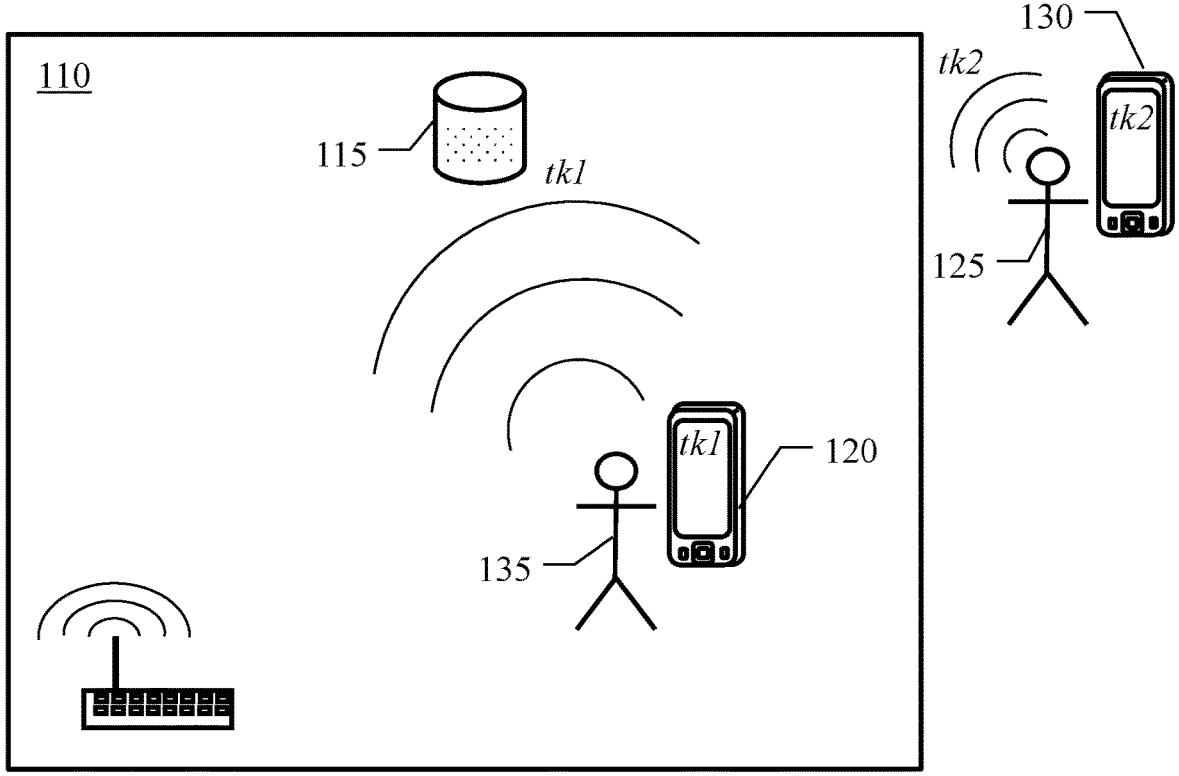

Moving to FIG. 1C, the client device 120 outputs the corresponding verification token (tk1), for example, by displaying it. A person 135 inside the location 110, such as an owner of the wireless network, reads the verification token displayed on the client device 120 and utters a confirmation message comprising it (such as the hot word of the smart speaker 115 followed by the verification token). The confirmation message is uttered loud enough to be heard by the smart speaker 115. Conversely, this is not possible for the client device 130. Indeed, likewise the client device 130 displays the corresponding verification token (tk2) that is read by the intruder 125. However, the intruder 125 (being outside the location 110) may not utter any confirmation message containing this verification token capable of reaching the smart speaker 115.

Figure 1D:
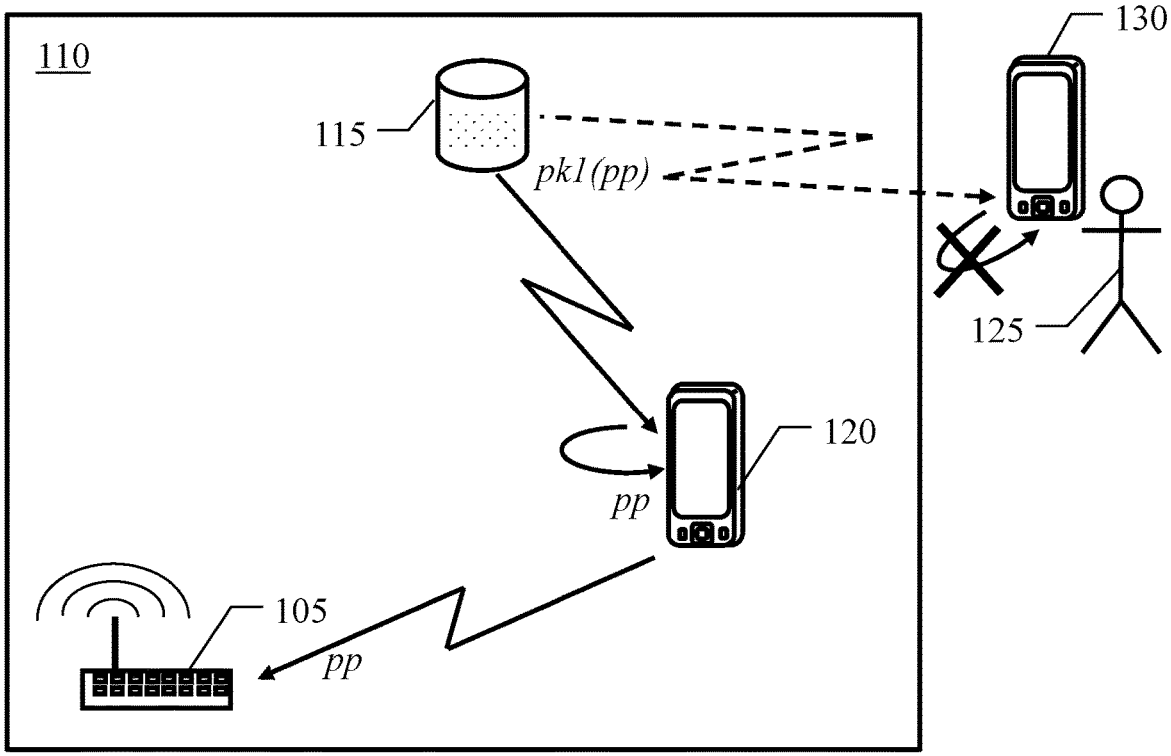

Moving to FIG. 1D, the smart speaker 115, once it has received the verification token of the client device 120, transmits an authorization message that comprises the passphrase of the wireless network (pp) encrypted with the public key of the client device 120 (pk1(pp)). The authorization message (for example, again of sound type) has a transmission range that covers the whole location 110, so as to allow it to reach the client device 120. In response thereto, the client device 120 extracts the encrypted passphrase from the authorization message, and decrypts it with its private key. The client device 120 may then connect to the access point 105 with the passphrase, so as to access the wireless network. As above, the authorization message may also reach the client device 130 of the intruder 125 (outside the location 110). However, the client device 130 may not decrypt the passphrase (since it does not know the private key of the client device 120 to which the authorization message is addressed).

The above-described solution allows distributing the passphrase selectively (only to the client devices of entitled subjects, authorized to access the wireless network). This prevents (or at least makes them very difficult) attacks of the man-in-the-middle type from intruders attempting to access the wireless network illicitly. Indeed, even if an (unauthorized) client device of an intruder may eavesdrop the messages that are exchanged between the smart speaker and the authorized client devices, it may not obtain the passphrase. All of the above significantly improves the security of the wireless network (with less risks, for example, that personal/confidential information might be grasped for malicious purposes).

Figure 2:
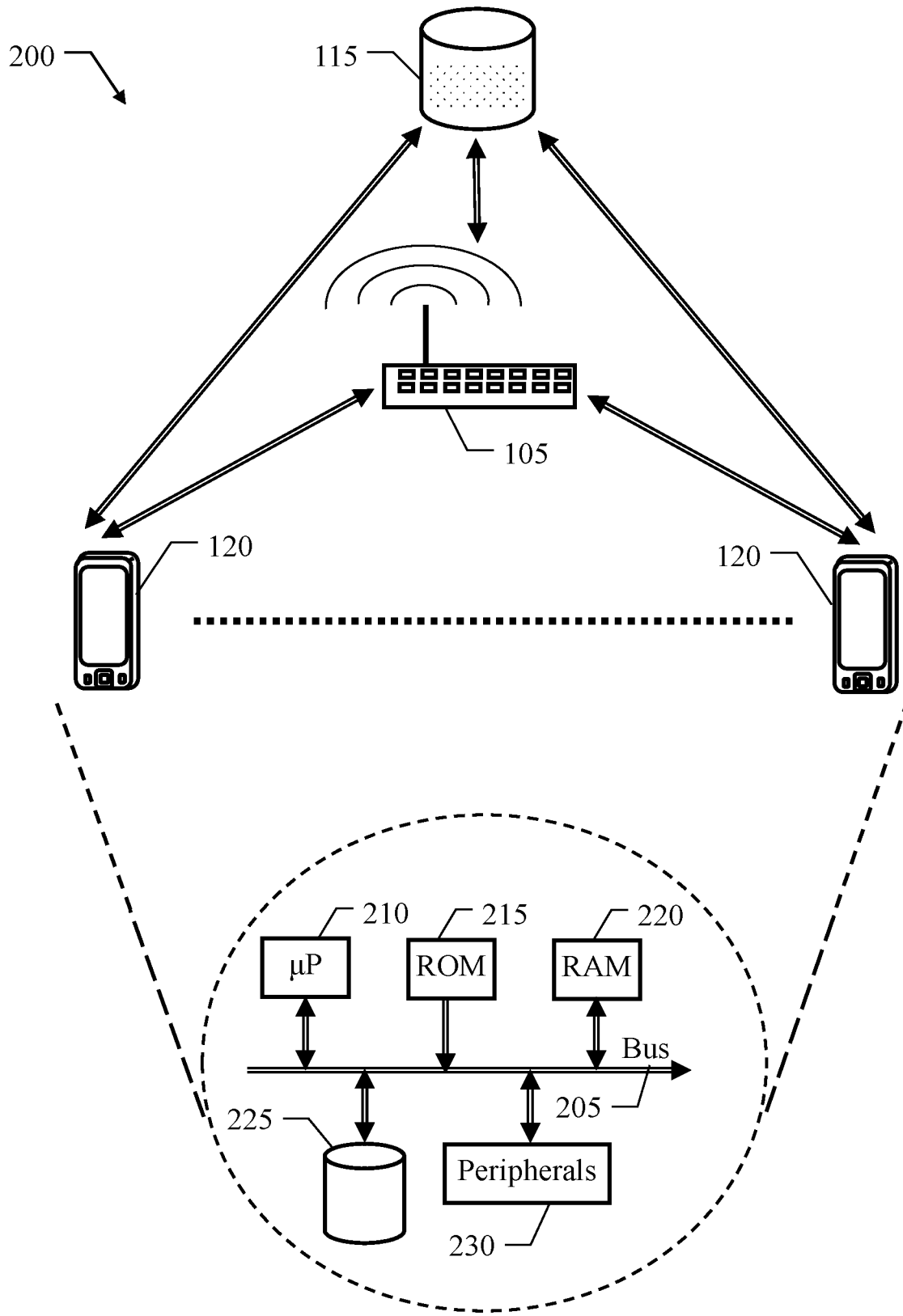
FIG. 2 shows a schematic block diagram of a wireless network wherein the solution according to an embodiment of the present disclosure may be practiced.

With reference now to FIG. 2, a schematic block diagram is shown of a wireless network 200 wherein the solution according to an embodiment of the present disclosure may be practiced.

The wireless network 200 comprises an access point 105 (or more), a smart speaker 115 (or more) and one or more (authorized) client devices 120 as above.

Each of the above-described computing devices (i.e., the access point 105, the smart speaker 115 and the client devices 120) comprises several units that are connected among them through a bus structure 205 with one or more levels. Particularly, one or more microprocessors (μP) 210 provide the logic capabilities of the computing device 105, 115,120; a non-volatile memory (ROM) 215 stores basic code for a bootstrap of the computing device 105,115,120 and a volatile memory (RAM) 220 is used as a working memory by the microprocessors 210. The computing device 105,115,120 is provided with a mass-memory 225 for storing programs and data (for example, a flash EPROM).

Moreover, the computing device 105,115,120 comprises a number of controllers for peripherals, or Input/Output (I/O) units, 230. For example, the peripherals 230 of the access point 105 comprise a Wireless Network Interface Card (WNIC) of the Wi-Fi type for implementing the communications in the wireless network 200 and a router for connecting to the Internet via a fixed-line telephone network (not shown in the figure), the peripherals 230 of the smart speaker 115 comprise a WNIC for communicating with the access point 105, a microphone for perceiving sounds and a loudspeaker for producing sounds, and the peripherals 230 of each client device 120 comprise a mobile telephone transceiver (TX/RX) for communicating over a mobile telephone network (not shown in the figure), a WNIC of the Wi-Fi type for communicating with the access points 105, a microphone for perceiving sounds, a loudspeaker for producing sounds and a screen for displaying information (generally a touch-screen for entering commands/data as well).

Figure 3:
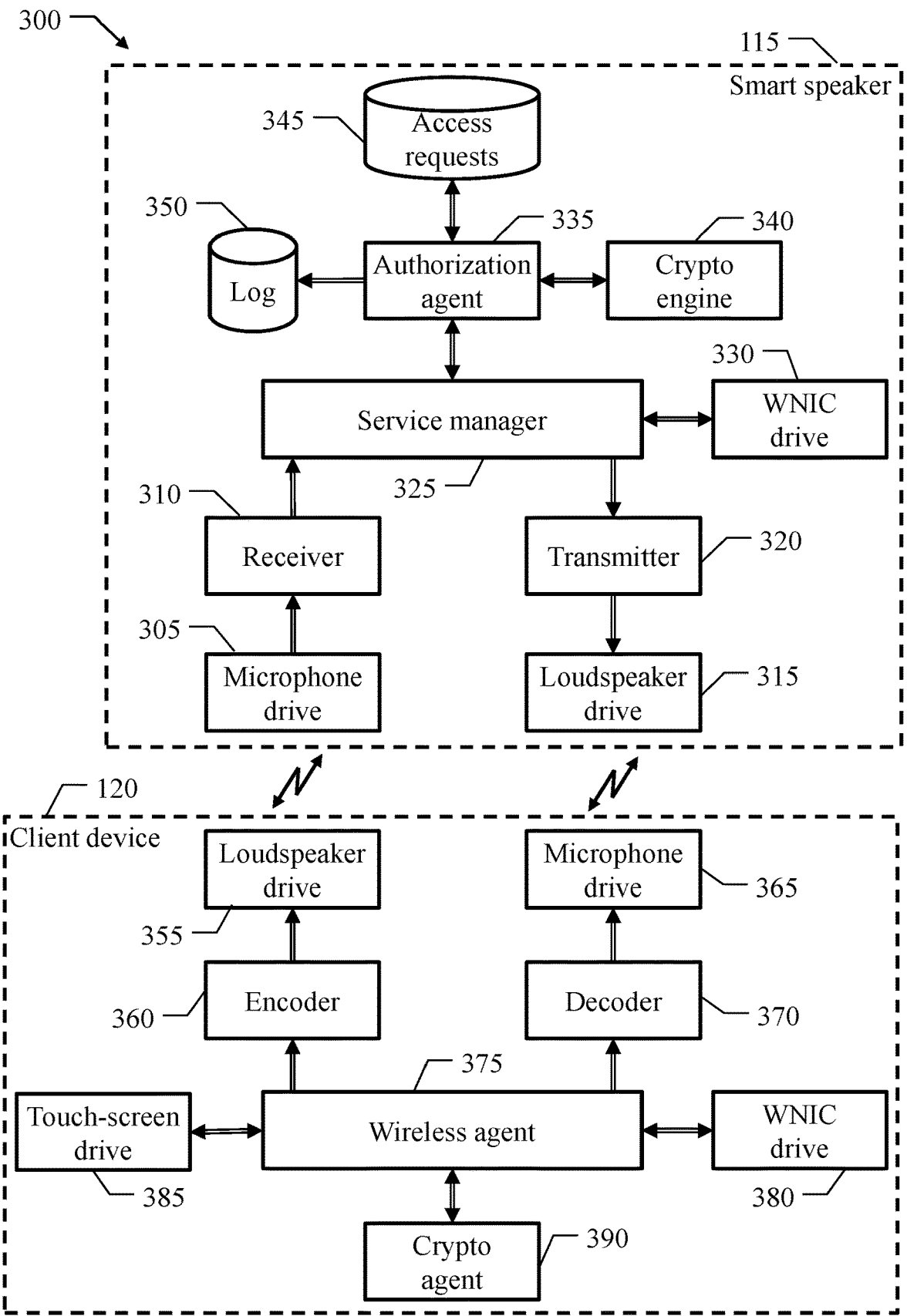
FIG. 3 shows the main software components that may be used to implement the solution according to an embodiment of the present disclosure.

Moving to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least in part) into the working memory of the smart speaker 115 and of each client device 120 (only one shown in the figure) when the programs are running. The programs are installed into the mass memory, for example, by pre-loading and/or downloading them from the Internet. In this respect, each program may be a module, segment or portion of code, which comprises one or more executable instructions for implementing the specified logical function.

Starting from the smart speaker 115, it comprises the following components. A microphone drive 305 drives the microphone for converting the sound perceived by it into an electrical signal that it is then transformed into a digital representation of the sound. A receiver 310 is fed by the microphone drive 305. The receiver 310 identifies any command present in the representation of the sound. Normally, the smart speaker 105 is designed to receive vocal commands in human language; for this purpose, the receiver 310 implements a speech recognition engine (generally exploiting a remote service over the Internet, not shown in the figure), which recognizes any speech present in the representation of the sound and translates it into text. The speech recognition engine may also implement an authentication mechanism to accept the vocal commands only from one or more authorized persons (such as the owner of the wireless network). For example, the authentication mechanism is of biometric type, such as based on (reference) vocal attributes of the authorized persons learned during a training phase of the smart speaker 115, which reference vocal attributes are stored in the speech recognition engine. In the solution according to an embodiment of the present disclosure, the receiver 310 is further designed to receive messages encoded in the sound; for this purpose, the receiver 310 also implements a decoder, which decodes any message present in the digital representation of the sound. A loudspeaker drive 315 drives the loudspeaker for transforming a digital representation of sound into an electrical signal that then creates the sound. A transmitter 320 feds the loudspeaker drive 315. Normally, the smart speaker 115 is designed to output vocal responses in human language or music (in response to the vocal commands); for this purpose, the transmitter 320 implements a text-to-speech engine, which translates text into a digital representation of speech, and a media player, which translates music files into a digital representation of music. In the solution according to an embodiment of the present disclosure, the transmitter 320 is further designed to transmit messages via sound; for this purpose, the transmitter 320 also implements an encoder, which encodes any message into a digital representation of sound. A service manager 325 is fed by the receiver 310 and feeds the transmitter 320. The service manager 325 processes any request submitted to the smart speaker 115. The service manager 325 interfaces with a WNIC drive 330, which drives the WNIC for exchanging information with access points (not shown in the figure). The WNIC drive 330 stores configuration information about the wireless network (to which the smart speaker 115 is connected), and particularly an identifier thereof (such as its Service Set Identifier, or SSID) and its passphrase (in a protected way). Normally, the smart speaker 115 is designed to serve the vocal commands (uttered by the owner of the wireless network); for this purpose, the service manager 325 interfaces with corresponding service agents (not show in the figure) implementing corresponding services, for example, for retrieving information from the Internet, downloading music, controlling home automation devices, sending chat messages or e-mails, updating calendar entries and so on. In the solution according to an embodiment of the present disclosure, the smart speaker 115 is further designed to authorize access to the wireless network. For this purpose, the service manager 325 interfaces with an authorization agent 335, which controls the distribution of the passphrase required for accessing the wireless network. The authorization agent 335 interfaces with a cryptographic engine 340, which performs cryptographic operations. The cryptographic engine 340 stores (in a protected way) a pair of public key and private key of the smart speaker 115. The (non-confidential) public key and the (confidential) private key are generated so that it is computationally unfeasible to obtain the private key from the public key; each (public/private) key may be used to encrypt information, with the other key that may then be used to decrypt the encrypted information (to restore its original form). The authorization agent 335 accesses (in read/write mode) an access requests repository 345, which is used to save information about (access) requests to access the wireless networks still being pending. For example, the access requests repository 345 comprises an entry for each access request still to be completed; the entry comprises its receipt time, an identifier of the client device requesting the access and possibly further identification information thereof, and its public key. The authorization agent 335 accesses (in write mode) an access requests log 350, which registers information about the access requests being processed over time. For example, the access requests log 350 comprises an entry for each access request that has been completed; the entry stores its receipt time, the identifier and the possible identification information of the client device requesting the access and an outcome of the access request (granted/denied).

Moving to a generic client device 120, it comprises the following components. A loudspeaker drive 355 drives the loudspeaker for transforming digital information representing sound into an electrical signal that then creates the sound. In the solution according to an embodiment of the present disclosure, an encoder 360 feeds the loudspeaker drive 355 (in addition to other components, not shown in the figure, for outputting speech/music during the normal operation of the client device 120). The encoder 360 encodes messages (to be transmitted via sound) into a digital representation of sound. A microphone drive 365 drives the microphone for converting any sound perceivable by it into an electrical signal that it then transforms into a digital representation of the sound. In the solution according to an embodiment of the present disclosure, a decoder 370 is fed by the microphone drive 365 (in addition to other components, not shown in the figure, for receiving speech during the normal operation of the client device 120). The decoder 370 decodes any message present in the digital representation of the sound. A wireless agent 375 controls access to wireless networks. The wireless agent 375 interfaces with a WNIC drive 380, which drives the WNIC for exchanging information with access points. The WNIC drive 380 stores configuration information about the wireless network (to which the client device 120 is connected), and particularly its identifier (SSID) and passphrase (in a protected way). The wireless agent 375 interfaces with a touch-screen drive 385, which drives the touch-screen for converting information into electric signals causing the display of images and for converting electric signals resulting from its touching into text. The wireless agent 375 interfaces with a cryptographic engine 390, which performs cryptographic operations; the cryptographic engine 390 stores (in a protected way) a pair of public key and private key of the client device 120.

Figure 4A:
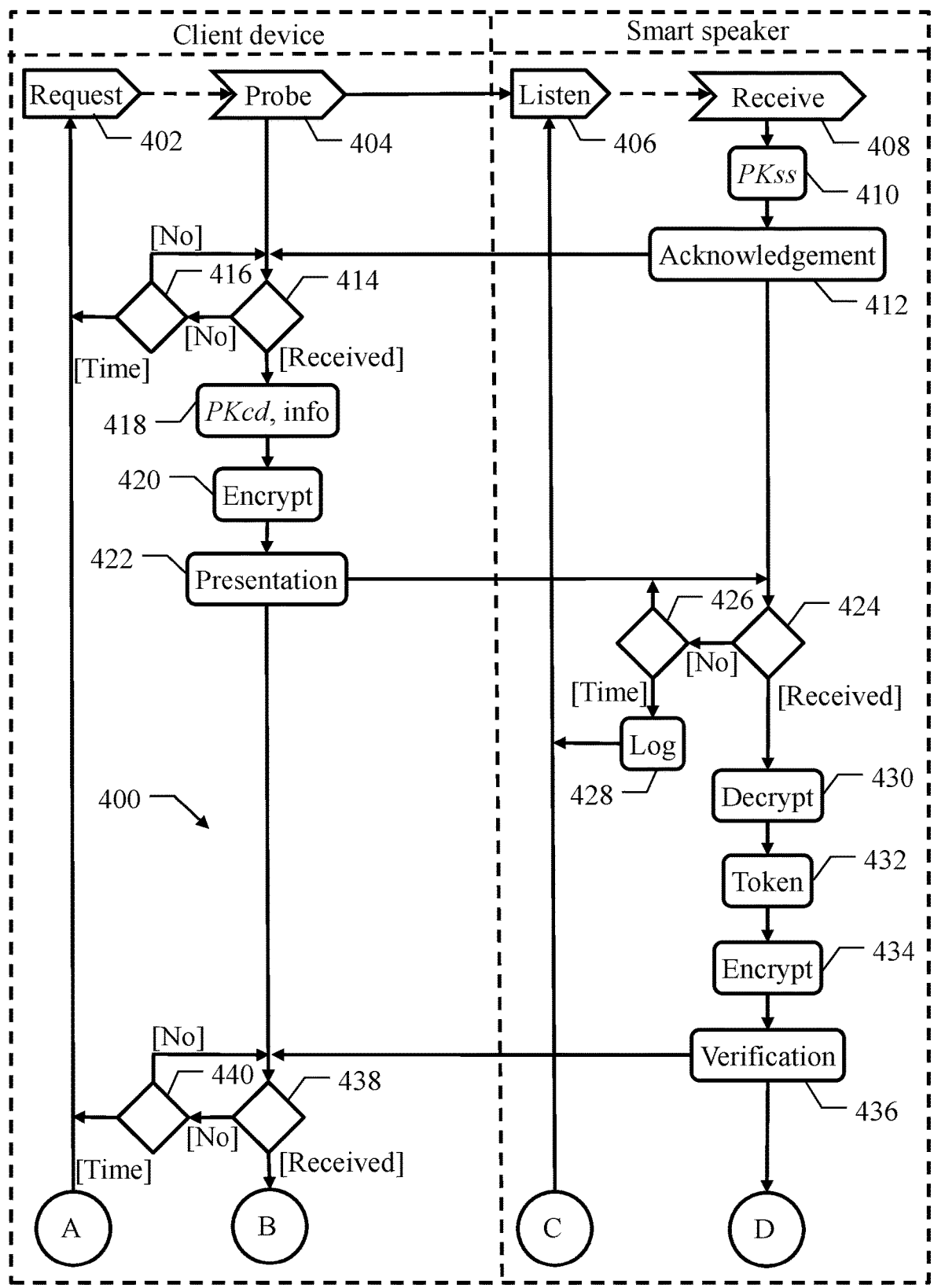
FIG. 4A-FIG. 4B show an activity diagram describing the flow of activities relating to an implementation of the solution according to an embodiment of the present disclosure.
Figure 4B:
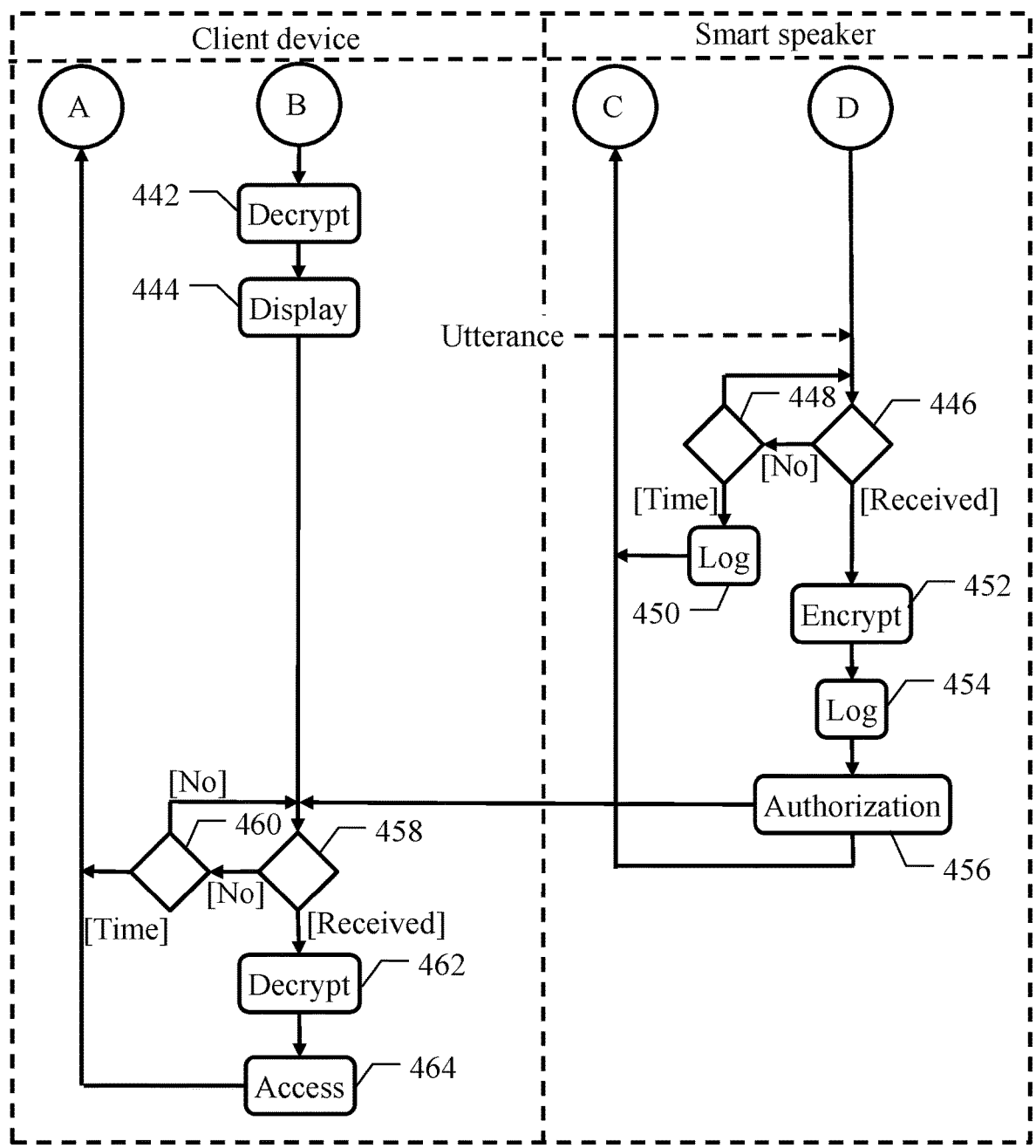

With reference now to FIG. 4A-FIG. 4B, an activity diagram is shown describing the flow of activities relating to an implementation of the solution according to an embodiment of the present disclosure.

Particularly, the activity diagram represents an exemplary process 400 that may be used to control the sharing of the passphrase for accessing the wireless network. In this respect, each block may correspond to one or more executable instructions for implementing the specified logical function on each workstation.

The process involves the exchange of a series of messages between the smart speaker and a generic client device within the location of the wireless network, which client device is authorized to access the wireless network (since its user is an entitled subject). For example, each message has a fixed length comprising a header, a body and a control (such as 4-8 bits, 128-256 bits and 4-8 bits, respectively); the header comprises an identification code of the type of message, the body comprises payload information of the message and the control comprise redundant information for error detection/correction. These messages are conveyed via a sound communication channel. For this purpose, the sound encoding the messages is broadcast according to its transmission range; within this transmission range, the sound is received and the message present in it is decoded. More specifically, in transmit mode each message is encoded as sound by translating the message into a modulating signal and modulating a carrier accordingly; conversely, in receive mode any message present in the sound is decoded by demodulating the carrier signal and translating the obtained modulating signal into the message. The sound has a frequency in a range allowing it to be produced by the loudspeakers and to be perceived by the microphones, generally in the (human) hearing range or in the near ultrasound range, such as 100 Hz-30 kHz; the messages are encoded according to a predefined coding schema, such as ASK, PSK, QAM, COFDM. For example, a frequency of 14-18 kHz provides a transmission rate of 2-50 kbits per second, so that the messages required to share the passphrase (of the order of 0.5-1.0 kbits) may be transmitted in 10-500 ms. This allows completing the process of sharing the passphrase in a relatively short time. The transmission range of the sound is relatively short, in any case shorter than a transmission range of radio waves used for communicating with the access points (for example, with the transmission range of the sound equal to 0.1-0.5 times the transmission range of the radio waves, such as of few meters in open air and in any case not passing through walls). This further reduces the risks of eavesdropping by intruders. Indeed, the short transmission range of the sound requires the intruders to put their client devices very close to the location of the wireless network (which may be impractical); moreover, the sound is difficult (if not impossible) to be produced by the client devices of the intruders without being heard by the owner of the wireless network. In any case, the sound that is received outside the location of the wireless network and that is transmitted from outside the location of the wireless network generally has a too poor signal-to-noise ratio preventing (or at least substantially hindering) its use.

Starting from the swim-lane of the (authorized) client device, the process passes from block 402 to block 404 as soon as the wireless agent receives an access request (for accessing the wireless network), such as via the touch-screen drive when the user enters a corresponding command In response thereto, the wireless agent builds a probe message; the probe message has the header comprising a corresponding identification code and the body comprising an identifier of the client device (for example, its IMEI). The wireless agent then controls the encoder to transmit the probe message encoded in sound.

Moving to the swim-lane of the smart speaker, the receiver is in a listening condition at block 406 for the digital representation of any sound. As far as relevant to the solution according to an embodiment of the present disclosure, the process passes from the block 406 to block 408 as soon as the decoder of the receiver detects the presence of a probe message in the digital representation of the sound (the one transmitted by the client device at block 404 in this case). In response thereto, the authorization agent adds a new entry to the access requests repository, comprising the time-stamp set to the current time (retrieved from a corresponding app) and the identifier of the client device (extracted from the probe message). The authorization agent at block 410 retrieves the identifier of the wireless network from the WNIC drive and the public key of the smart speaker (PKss) from the cryptographic engine. The authentication agent at block 412 builds an acknowledgment message; the acknowledgment message has the header comprising a corresponding identification code and the body comprising the identifier of the client device, the identifier of the wireless network and the public key of the smart speaker. The authentication agent then controls the encoder of the transmitter to transmit the acknowledgment message encoded in sound.

Returning to the swim-lane of the client device, the process descends from the block 404 to block 414, wherein the wireless agent enters an idle loop waiting for the acknowledgment message. Particularly, the wireless agent verifies whether the acknowledgment message from the smart speaker for the client device has been received (as indicated by their identifiers). If not, the wireless agent at block 416 verifies whether a time-out has expired from the transmission of the probe message (for example, 2-5 s). If not, the process returns to the block 414 to repeat the same operation continually. Conversely, once the time-out has expired without receiving the acknowledgment message (meaning that the smart speaker has some problems), the process is aborted by returning to the block 402 waiting for a next access request. With reference again to the block 414, as soon as the acknowledgment message is received (the one transmitted by the smart speaker at block 412 in this case) the process descends into block 418. At this point, the wireless agent retrieves the public key of the client device (PKcd) from the cryptographic engine; at the same time, the wireless agent may also retrieve presentation information of the client device from corresponding apps (for example, its UICC, a user account of its user and so on), possibly after obtaining a corresponding consent from the user of the client device, especially when the presentation information may be of private type. The cryptographic engine at block 420 encrypts the presentation information of the client device, if any, with the public key of the smart speaker (extracted from the acknowledgment message). The wireless agent at block 422 builds a presentation message; the presentation message has the header comprising a corresponding identification code and the body comprising the identifier of the wireless network (extracted from the acknowledgment message), the identifier of the client device and the (encrypted) public key and possible presentation information thereof. The wireless agent then causes the encoder to transmit the presentation message encoded in sound.

Returning to the swim-lane of the smart speaker, the process descends from the block 412 to block 424, wherein the authorization agent enters an idle loop waiting for the presentation message. Particularly, the authorization agent verifies whether the presentation message from the client device for the smart speaker has been received (as indicated by their identifiers). If not, the authorization agent at block 426 verifies whether a time-out has expired from the transmission of the acknowledgment message (for example, 2-5 s). If not, the process returns to the block 424 to repeat the same operation continually. Conversely, once the time-out has expired without receiving the presentation message (meaning that the client device has some problems), the authorization agent at block 428 sets the outcome of the access request to "denied" into the corresponding entry of the access requests repository, and moves this entry to the access requests log. The process is then aborted by returning to the block 406 waiting for a next probe message. With reference again to the block 424, as soon as the presentation message is received (the one transmitted by the client device at block 422 in this case) the process descends into block 430. At this point, the cryptographic engine decrypts the public key and the possible presentation information of the client device (extracted from the presentation message) with the private key of the smart speaker. This ensures that possible presentation information of private type is received only by the smart speaker (to which the user of the client device has given his/her consent). Indeed, even if an (unauthorized) client device of an intruder may eavesdrop the presentation message it may not decrypt the presentation information contained therein. The authorization agent at block 432 generates a (new) verification token for the client device (as a random number different from all the verification tokens present in the access requests repository) and adds it to the entry of the client device in the access requests repository. The cryptographic engine at block 434 encrypts the verification token with the public key of the client device (retrieved from the corresponding entry of the access requests repository). The authorization agent at block 436 builds a verification message; the verification message has the header comprising a corresponding identification code and the body comprising the identifier of the wireless network, the identifier of the client device and the (encrypted) verification token. The authorization agent then controls the encoder of the transmitter to transmit the verification message encoded in sound.

Returning to the swim-lane of the client device, the process descends from the block 422 to block 438, wherein the wireless agent enters an idle loop waiting for the verification message. Particularly, the wireless agent verifies whether the verification message from the smart speaker for the client device has been received (as indicated by their identifiers). If not, the wireless agent at block 440 verifies whether a time-out has expired from the transmission of the presentation message (for example, 2-5 s). If not, the process returns to the block 438 to repeat the same operation continually. Conversely, once the time-out has expired without receiving the verification message (meaning that the smart speaker has some problems), the process is aborted by returning to the block 402 waiting for a next access request. With reference again to the block 438, as soon as the verification message is received (the one transmitted by the smart speaker at block 436 in this case) the process descends into block 442. At this point, the cryptographic engine decrypts the verification token (extracted from the verification message) with the private key of the client device. The wireless agent at block 444 controls the touch-screen drive to display the verification token.

Returning to the swim lane of the smart speaker, the process descends from the block 436 to block 446, wherein the authorization agent enters an idle loop waiting for the utterance of the verification token. Particularly, the speech recognition engine of the receiver verifies whether any perceived sound has been uttered by the owner of the wireless network (i.e., its vocal attributes match the ones stored in the speech recognition engine), and if so whether a hot word of the smart speaker (used to introduce vocal commands addressed thereto) has been recognized; if so, the authorization agent verifies whether the verification token has been recognized after the hot word. If not, the authorization agent at block 448 verifies whether a time-out has expired from the transmission of the verification message (for example, 2-5 s). If not, the process returns to the block 446 to repeat the same operation continually. Conversely, once the time-out has expired without receiving the utterance of the verification token (meaning that its user has some problems), the authorization agent at block 450 sets the outcome of the access request to "denied" into the corresponding entry of the access requests repository, and moves this entry to the access requests log. The process is then aborted by returning to the block 406 waiting for a next probe message. With reference again to the block 446, as soon as the utterance (by the owner of the wireless network) of the hot word followed by the verification token is received (as indicated by a dashed arrow in the figure) the process descends into block 452. The authentication of the owner of the smart speaker adds further security, since it makes it very difficult (if not impossible) for the intruder to utter its verification token for the smart speaker. At this point, the cryptographic engine encrypts the passphrase (retrieved from the WNIC drive) with the public key of the client device (retrieved from the corresponding entry of the access requests repository). The authorization agent at block 454 sets the outcome of the access request to "granted" into the corresponding entry of the access requests repository, and moves it to the access requests log. The authorization agent at block 456 builds an authorization message; the authorization message has the header comprising a corresponding identification code and the body comprising the identifier of the wireless network, the identifier of the client device and the (encrypted) passphrase. The authorization agent then controls the encoder of the transmitter to transmit the authorization message encoded in sound. The process now returns to the block 406 waiting for a next probe message.

Returning to the swim-lane of the client device, the process descends from the block 444 to block 458, wherein the wireless agent enters an idle loop waiting for the authorization message. Particularly, the wireless agent verifies whether the authorization message from the smart speaker for the client device has been received (as indicated by their identifiers). If not, the wireless agent at block 460 verifies whether a time-out has expired from the display of the verification token (for example, 5-10 s). If not, the process returns to the block 458 to repeat the same operation continually. Conversely, once the time-out has expired without receiving the authorization message (meaning that the smart speaker has some problems), the process is aborted by returning to the block 402 waiting for a next access request. With reference again to the block 458, as soon as the authorization message is received (the one transmitted by the smart speaker at block 456 in this case) the process descends into block 462. At this point, the cryptographic engine decrypts the passphrase (extracted from the authorization message) with the private key of the client device. The WNIC drive at block 464 stores the identifier of the wireless network and its passphrase. The WNIC drive then connects to the access point with the passphrase as usual. The process returns to the block 402 waiting for a next access request (once disconnected from the wireless network).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for distributing secret information for accessing a wireless computing network. However, the secret information may be of any type (for example, a passphrase, a password, a PIN and so on); the secret information may be used for accessing a wireless network of any type (for example, Wi-Fi, Wi-Max and so on) and for any purpose (for example, for accessing the Internet, entering an intranet, downloading/uploading information and so on).

In an embodiment, the method comprises the following steps under the control of a source computing device. However, the source computing device may be of any type (see below).

In an embodiment, the method comprises receiving (by the source computing device) a presentation message. However, the presentation message may be of any type (for example, with fixed/variable length, with or without a control, and so on) and it may be received in any way (for example, via a sound communication channel, a radio communication channel and so on).

In an embodiment, the presentation message is received from a target computing device requesting an access to the wireless computing network. However, the target computing device may be of any type (see below).

In an embodiment, the presentation message comprises a target public key of the target computing device. However, the presentation message may have any content (for example, the target public key alone or with additional information, such as any identifier of the target computing device, of the source computing device, of the wireless computing network and so on).

In an embodiment, the method comprises transmitting (by the source computing device) a verification message comprising a verification token associated with the target computing device in response to the presentation message. However, the verification token may be of any type (for example, a random number, a progressive number and so on) and it may be associated with the target computing device in any way (for example, by using any identifier of the target computing device allowing retrieving the verification token, such as with a lookup table, a formula and the like, by setting the verification token to a part of the identifier and so on). The verification message may have any content (for example, the token alone or with additional information, such as any identifier of the target computing device, of the source computing device, of the wireless computing network and so on); the verification message may be of any type and it may be transmitted in any way (either the same or different with respect to above).

In an embodiment, the method comprises receiving (by the source computing device) a confirmation message of vocal type comprising an utterance of the verification token in response to the verification message. However, the confirmation message may be of any type (for example, starting with any hot word, only consisting of the verification token and so on) and it may be received in any way (for example, with any authentication, without authentication and so on).

In an embodiment, the method comprises encrypting (by the source computing device) the secret information with the target public key. However, this operation may be performed at any time (for example, after receiving the confirmation message, in advance after receiving the presentation message and so on).

In an embodiment, the method comprises transmitting (by the source computing device) an authorization message comprising the encrypted secret information in response to the confirmation message. However, the authorization message may have any content (for example, the encrypted secret information alone or with additional information, such as any identifier of the target computing device, of the source computing device, of the wireless computing network and so on); the authorization message may be of any type and it may be transmitted in any way (either the same or different with respect to above).

Further embodiments provide additional advantageous features, which may however be omitted at all in a basic implementation.

Particularly, in an embodiment the method comprises transmitting (by the source computing device) the verification message comprising the verification token encrypted with the target public key in response to the presentation message. However, the possibility of transmitting the verification token in clear form is not excluded.

In an embodiment, the method comprises authenticating (by the source computing device) a person uttering the confirmation message. However, the person may be any authorized one (for example, an owner of the wireless network, any member of a family, any employee of a company and so on) and it may be authenticated in any way (for example, according to biometric data, such as voice, face and the like, according to a PIN and so on).

In an embodiment, the method comprises receiving (by the source computing device) the presentation message further comprising presentation information of the target computing device. However, the presentation information may be of any type (for example, IMEI, IMSI, user account, user's name, user's company and so on) and it may be received for any purpose (for example, auditing, accounting, verification of Service Level Agreement (SLA), and so on).

In an embodiment, the method comprises receiving (by the source computing device) a probe message from the target computing device. However, the probe message may have any content (for example, with a fixed content, comprising any identifier of the target computing device and so on); the probe message may be of any type and it may be received in any way (either the same or different with respect to above), down to missing at all.

In an embodiment, the method comprises transmitting (by the source computing device) an acknowledgment message comprising a source public key of the source computing device in response to the probe message. However, the acknowledge message may have any content (for example, the source public key alone or with additional information, such as any identifier of the target computing device, of the source computing device, of the wireless computing network and so on); the acknowledgment message may be of any type and it may be transmitted in any way (either the same or different with respect to above), down to missing at all.

In an embodiment, the method comprises receiving (by the source computing device) the presentation message comprising the presentation information encrypted with the source public key in response to the acknowledgment message. However, the possibility of receiving the presentation information in clear form is not excluded.

In an embodiment, the method comprises decrypting (by the source computing device) the presentation information comprised in the presentation message with a source private key corresponding to the source public key. However, this operation may be omitted at all when the presentation information is provided in clear form.

In an embodiment, the method comprises receiving (by the source computing device) the probe message via an auxiliary communication channel having an auxiliary communication range shorter than a wireless communication range of the wireless computing network. However, the auxiliary communication channel may be of any type (for example, sound, Bluetooth® and so on), and it may have any communication range (in terms either relative or absolute); in any case, the possibility is not excluded of receiving the probe message via any other communication channel having any communication range (including the one of the wireless computing network).

In an embodiment, the method comprises transmitting (by the source computing device) the acknowledgment message in response to the probe message via the auxiliary communication channel. However, the possibility is not excluded of transmitting the acknowledgment message via any other communication channel having any communication range (either the same or different with respect to above, including the one of the wireless computing network).

In an embodiment, the method comprises receiving (by the source computing device) the presentation message in response to the acknowledgment message via the auxiliary communication channel. However, the presentation message may be received via any communication channel (either the same or different with respect to above, including the one of the wireless computing network).

In an embodiment, the method comprises transmitting (by the source computing device) the verification message in response to the presentation message via the auxiliary communication channel. However, the verification message may be transmitted via any communication channel (either the same or different with respect to above, including the one of the wireless computing network).

In an embodiment, the method comprises transmitting (by the source computing device) the authorization message in response to the confirmation message via the auxiliary communication channel. However, the authorization message may be transmitted via any communication channel (either the same or different with respect to above, including the one of the wireless computing network).

In an embodiment, the auxiliary communication channel comprises a sound communication channel. However, the sound communication channel may be of any type (for example, in the hearing range, in the near ultrasound range and so on).

An embodiment provides a method for obtaining secret information for accessing a wireless computing network. However, the secret information may be of any type and it may be used for accessing a wireless network of any type (see above).

In an embodiment, the method comprises the following steps under the control of a target computing device requesting an access to the wireless computing network. However, the target computing device may be of any type (see below).

In an embodiment, the method comprises transmitting (by the target computing device) a presentation message comprising a target public key of the target computing device. However, the presentation message may have any content, may be of any type and may be transmitted in any way (see above).

In an embodiment, the method comprises receiving (by the target computing device) a verification message comprising a verification token associated with the target computing device in response to the presentation message. However, the verification message may have any content, may be of any type and may be received in any way (see above).

In an embodiment, the method comprises outputting (by the target computing device) the verification token in response to the verification message. However, the verification token may be output in any way (for example, displayed, uttered and so on) by any output unit (for example, a touch-screen, a passive display, a loudspeaker and so on).

In an embodiment, the method comprises receiving (by the target computing device) an authorization message comprising the secret information encrypted with the target public key in response to a confirmation message of vocal type comprising an utterance of the verification token. However, the authorization message may have any content, may be of any type and may be received in any way (see above).

In an embodiment, the method comprises decrypting (by the target computing device) the encrypted secret information with a target private key corresponding to the target public key. However, the secret information may be decrypted for any purpose (for example, to connect to an access point, to exchange information and so on).

Further embodiments provide additional advantageous features, which may however be omitted at all in a basic implementation.

Particularly, in an embodiment the method comprises outputting (by the target computing device) the verification token in response to the verification message by displaying the verification code to cause a person to utter the verification code. However, the verification token may be displayed in any way (for example, with a notification, a message and so on); in any case, the possibility is not excluded of uttering the verification code automatically by the target computing device (without requiring any human intervention).

In an embodiment, the method comprises receiving (by the target computing device) the verification message comprising the verification token encrypted with the target public key in response to the presentation message. However, the possibility of receiving the verification token in clear form is not excluded.

In an embodiment, the method comprises decrypting (by the target computing device) the verification token with the target private key. However, this operation may be omitted at all when the verification token is received in clear form.

In an embodiment, the method comprises transmitting (by the target computing device) the presentation message further comprising presentation information of the target computing device. However, the presentation information may be of any type and it may be transmitted for any purpose (see above), either automatically or only after manual confirmation.

In an embodiment, the method comprises transmitting (by the target computing device) a probe message. However, the probe message may have any content, may be of any type and may be transmitted in any way (see above).

In an embodiment, the method comprises receiving (by the target computing device) an acknowledgment message comprising a source public key of a source computing device in response to the probe message. However, the source computing device may be of any type (see below); the acknowledgment message may have any content, may be of any type and may be received in any way (see above).

In an embodiment, the method comprises encrypting (by the target computing device) the presentation information with the source public key. However, the presentation information may be encrypted in any way (for example, completely, only in part, alone or together with the target public key and so on) or it may be omitted at all.

In an embodiment, the method comprises transmitting (by the target computing device) the presentation message further comprising the encrypted presentation information in response to the acknowledgment message. However, the possibility is not excluded of transmitting the presentation information in clear form.

In an embodiment, the method comprises transmitting (by the target computing device) the probe message via an auxiliary communication channel having an auxiliary communication range shorter than a wireless communication range of the wireless computing network. However, the auxiliary communication channel may be of any type and with any communication range (see above). In any case, the probe message may be transmitted via any other communication channel having any communication range (see above).

In an embodiment, the method comprises receiving (by the target computing device) the acknowledgment message in response to the probe message via the auxiliary communication channel. However, the acknowledgment message may be received via any other communication channel having any communication range (see above).

In an embodiment, the method comprises transmitting (by the target computing device) the presentation message in response to the acknowledgment message via the auxiliary communication channel. However, the presentation message may be transmitted via any other communication channel having any communication range (see above).

In an embodiment, the method comprises receiving (by the target computing device) the authorization message in response to the confirmation message via the auxiliary communication channel. However, the authorization message may be received via any other communication channel having any communication range (see above).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a source computing machine to perform the above-mentioned method. An embodiment provides a computer program product for distributing secret information for accessing a wireless computing network. The computer program product comprises a computer readable storage medium that has program instructions embodied therewith. The program instructions are executable by a source computing device to cause the source computing device to perform the same method. However, the computer program may be implemented as a stand-alone module, as a plug-in for a pre-existing software program (for example, the service manager) or directly therein. Moreover, the computer program may be executed on any source computing machine (see below). An embodiment provides a computer program that is configured for causing a target computing machine to perform the above-mentioned method. An embodiment provides a computer program product for obtaining secret information for accessing a wireless computing network. The computer program product comprises a computer readable storage medium that has program instructions embodied therewith. The program instructions are executable by a target computing device (requesting an access to the wireless computing network) to cause the target computing device to perform the same method. However, the computer program may be implemented as a stand-alone module, as a plug-in for a pre-existing software program (for example, the WNIC drive) or directly therein. Moreover, the computer program may be executed on any target computing machine (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a source computing device comprising means that are configured for performing the steps of the above-described method. An embodiment provides a source computing device comprising a circuit (i.e., any hardware suitably configured, for example, by software) for performing each step of the above-described method. However, the source computing device may be of any type (for example, a smart speaker, an access point, a personal computer and so on).

An embodiment provides a target computing device comprising means that are configured for performing the steps of the above-described method. An embodiment provides a target computing device comprising a circuit (i.e., any hardware suitably configured, for example, by software) for performing each step of the above-described method. However, the target computing device may be of any type (for example, mobile/fixed, such as a smartphone, a table, a laptop, a desktop and so on).

Generally, similar considerations apply if the source computing device and the target computing device each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device for a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributing secret information for accessing a wireless computing network, wherein the method comprises:
   receiving, by a source computing device, a presentation message from a target computing device requesting an access to the wireless computing network, the presentation message comprising a target public key of the target computing device;
   transmitting, by the source computing device, a verification message comprising a verification token associated with the target computing device in response to the presentation message;
   receiving, by the source computing device, a confirmation message of vocal type comprising an utterance of the verification token in response to the verification message;
   encrypting, by the source computing device, the secret information with the target public key; and
   transmitting, by the source computing device, an authorization message comprising the encrypted secret information in response to the confirmation message.

2. The method according to claim 1, wherein the method comprises:
   transmitting, by the source computing device, the verification message comprising the verification token encrypted with the target public key in response to the presentation message.

3. The method according to claim 1, wherein the method comprises:
   authenticating, by the source computing device, a person uttering the confirmation message.

4. The method according to claim 1, wherein the method comprises:
receiving, by the source computing device, the presentation message further comprising presentation information of the target computing device.

5. The method according to claim 4, wherein the method comprises:
receiving, by the source computing device, a probe message from the target computing device;
transmitting, by the source computing device, an acknowledgment message comprising a source public key of the source computing device in response to the probe message;
receiving, by the source computing device, the presentation message comprising the presentation information encrypted with the source public key in response to the acknowledgment message; and
decrypting, by the source computing device, the presentation information comprised in the presentation message with a source private key corresponding to the source public key.

6. The method according to claim 5, wherein the method comprises:
receiving, by the source computing device, the probe message via an auxiliary communication channel having an auxiliary communication range shorter than a wireless communication range of the wireless computing network;
transmitting, by the source computing device, the acknowledgment message in response to the probe message via the auxiliary communication channel;
receiving, by the source computing device, the presentation message in response to the acknowledgment message via the auxiliary communication channel;
transmitting, by the source computing device, the verification message in response to the presentation message via the auxiliary communication channel; and
transmitting, by the source computing device, the authorization message in response to the confirmation message via the auxiliary communication channel.

7. The method according to claim 6, wherein the auxiliary communication channel comprises a sound communication channel.

8. A method for obtaining secret information for accessing a wireless computing network, wherein the method comprises:
transmitting, by a target computing device requesting an access to the wireless computing network, a presentation message comprising a target public key of the target computing device;
receiving, by the target computing device, a verification message comprising a verification token associated with the target computing device in response to the presentation message;
outputting, by the target computing device, the verification token in response to the verification message;
receiving, by the target computing device, an authorization message comprising the secret information encrypted with the target public key in response to a confirmation message of vocal type comprising an utterance of the verification token; and
decrypting, by the target computing device, the encrypted secret information with a target private key corresponding to the target public key.

9. The method according to claim 8, wherein the method comprises:
outputting, by the target computing device, the verification token in response to the verification message by displaying the verification code to cause a person to utter the verification code.

10. The method according to claim 8, wherein the method comprises:
receiving, by the target computing device, the verification message comprising the verification token encrypted with the target public key in response to the presentation message; and
decrypting, by the target computing device, the verification token with the target private key.

11. The method according to claim 8, wherein the method comprises:
transmitting, by the target computing device, the presentation message further comprising presentation information of the target computing device.

12. The method according to claim 11, wherein the method comprises:
transmitting by the target computing device, a probe message;
receiving, by the target computing device, an acknowledgment message comprising a source public key of a source computing device in response to the probe message;
encrypting, by the target computing device, the presentation information with the source public key; and
transmitting, by the target computing device, the presentation message further comprising the encrypted presentation information in response to the acknowledgment message.

13. The method according to claim 12, wherein the method comprises:
transmitting, by the target computing device, the probe message via an auxiliary communication channel having an auxiliary communication range shorter than a wireless communication range of the wireless computing network;
receiving, by the target computing device, the acknowledgment message in response to the probe message via the auxiliary communication channel;
transmitting, by the target computing device, the presentation message in response to the acknowledgment message via the auxiliary communication channel; and
receiving, by the target computing device, the authorization message in response to the confirmation message via the auxiliary communication channel.

14. The method according to claim 13, wherein the auxiliary communication channel comprises a sound communication channel.

15. A source computing device for distributing secret information for accessing a wireless computing network, the source computing device comprising:
a receiver for receiving a presentation message from a target computing device requesting an access to the wireless computing network, the presentation message comprising a target public key of the target computing device;
a transmitter for transmitting a verification message comprising a verification token associated with the target computing device in response to the presentation message;
the receiver further for receiving a confirmation message of vocal type comprising an utterance of the verification token in response to the verification message;

a cryptographic engine for encrypting the secret information with the target public key; and the transmitter further for transmitting an authorization message comprising the encrypted secret information in response to the confirmation message.

16. The source computing device of claim 15, wherein the verification message comprising the verification token is encrypted with the target public key.

17. The source computing device of claim 15, further comprising a speech recognition engine to authenticate a person uttering the confirmation message.

18. The source computing device of claim 15, wherein the presentation message further comprising presentation information of the target computing device.

19. The source computing device of claim 18, wherein:
the receiver further for receiving a probe message from the target computing device;
the transmitter further for transmitting an acknowledgment message comprising a source public key of the source computing device in response to the probe message;
the receiver further for receiving the presentation message further comprising the presentation information encrypted with the source public key in response to the acknowledgment message; and
the cryptographic engine further for decrypting the presentation information comprised in the presentation message with a source private key corresponding to the source public key.

20. The source computing device of claim 19, wherein the method comprises:
the receiver further for receiving the probe message via an auxiliary communication channel having an auxiliary communication range shorter than a wireless communication range of the wireless computing network;
the transmitter further for transmitting the acknowledgment message in response to the probe message via the auxiliary communication channel;
the receiver further for receiving the presentation message in response to the acknowledgment message via the auxiliary communication channel;
the transmitter further for transmitting the verification message in response to the presentation message via the auxiliary communication channel; and
the transmitter further for transmitting the authorization message in response to the confirmation message via the auxiliary communication channel;
wherein the auxiliary communication channel comprises a sound communication channel.

* * * * *